Nov. 2, 1965   J. C. SILLIMAN ETAL   3,215,169
MACHINE FOR MAKING WIRE CAGES
Filed April 15, 1963   4 Sheets-Sheet 3
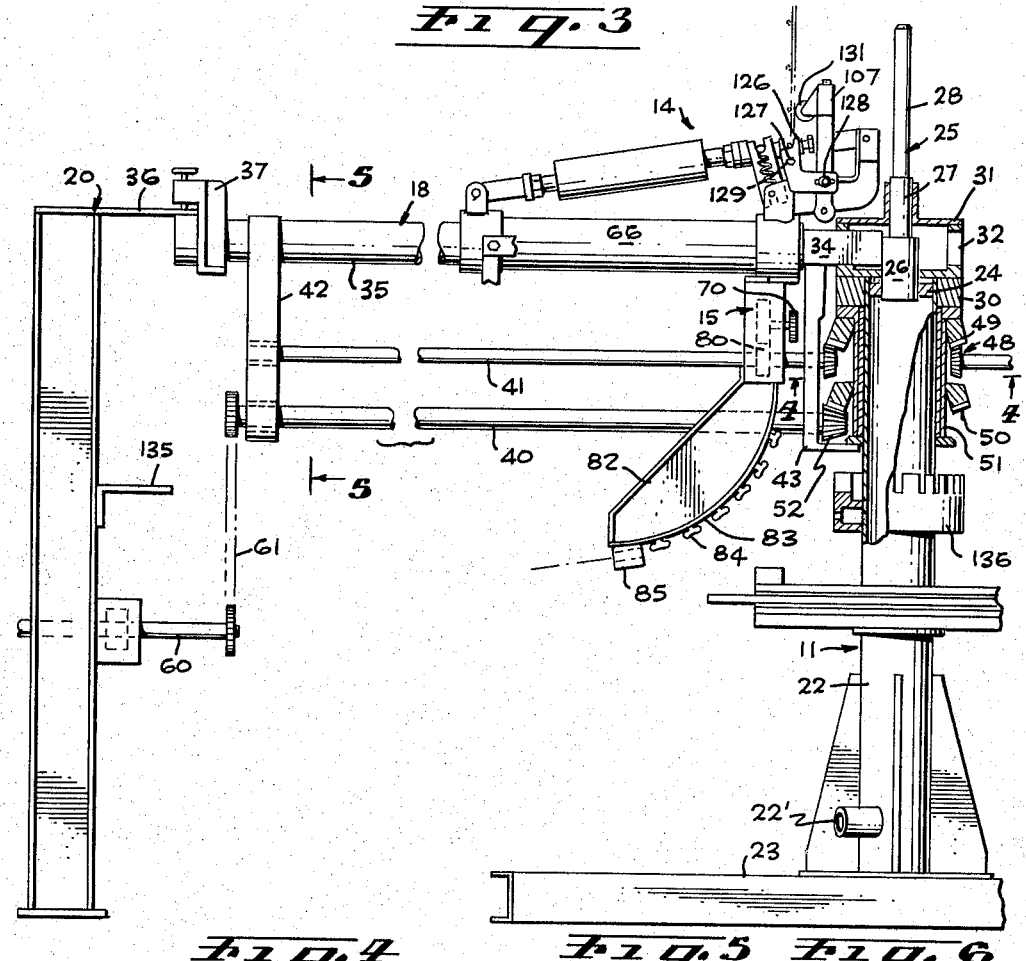
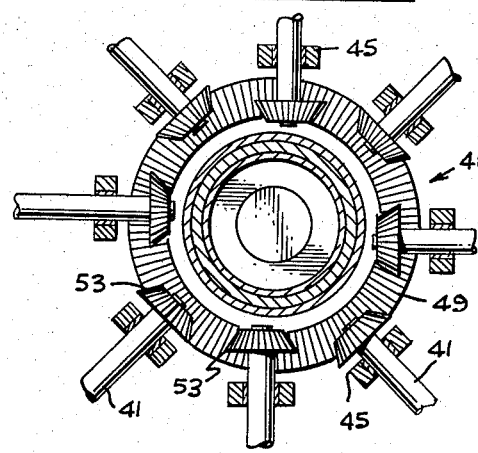
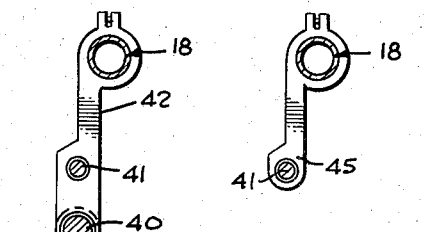
JOHN C. SILLIMAN
GEORGE E. HUCK
INVENTORS
BY
ATTORNEYS

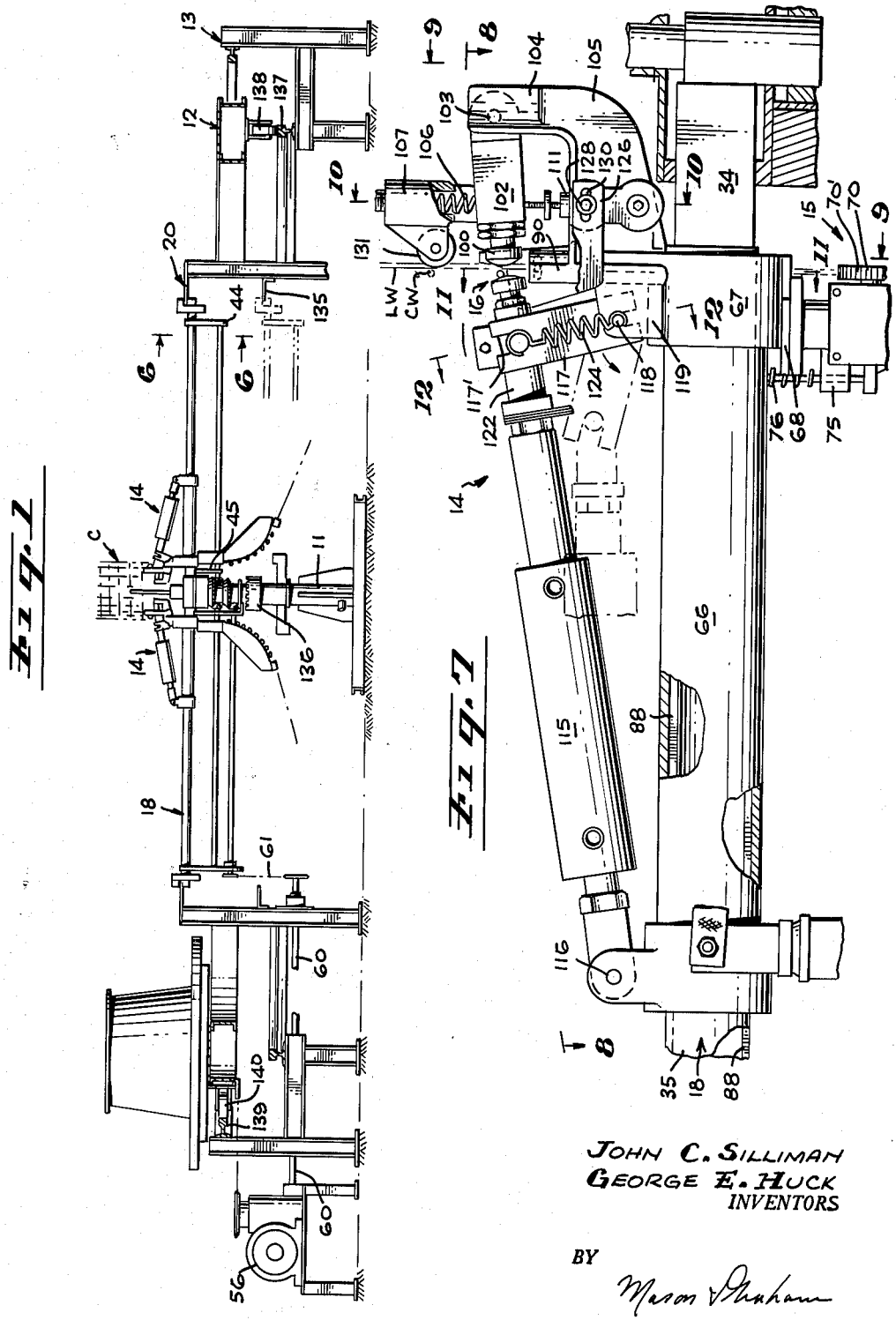

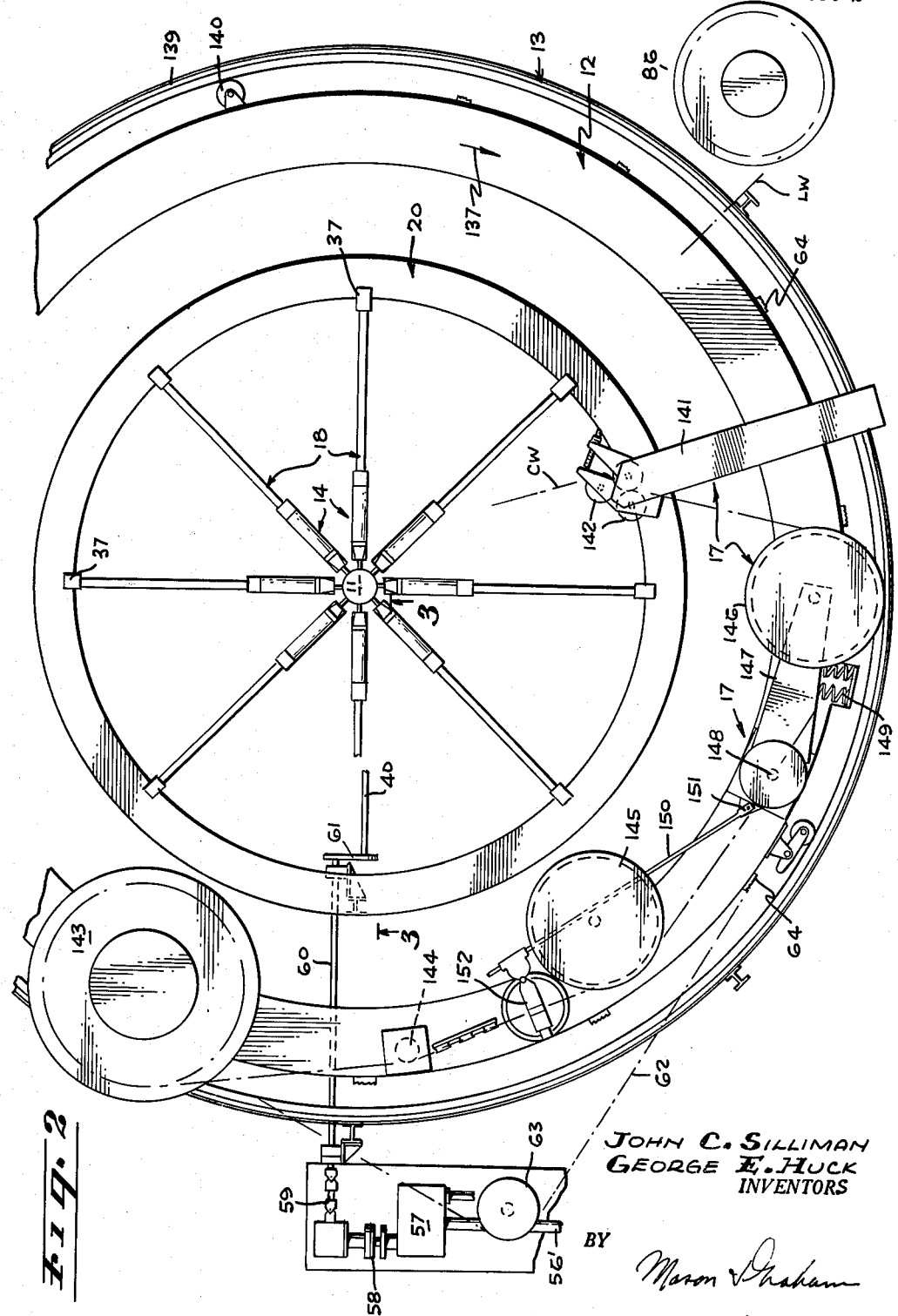

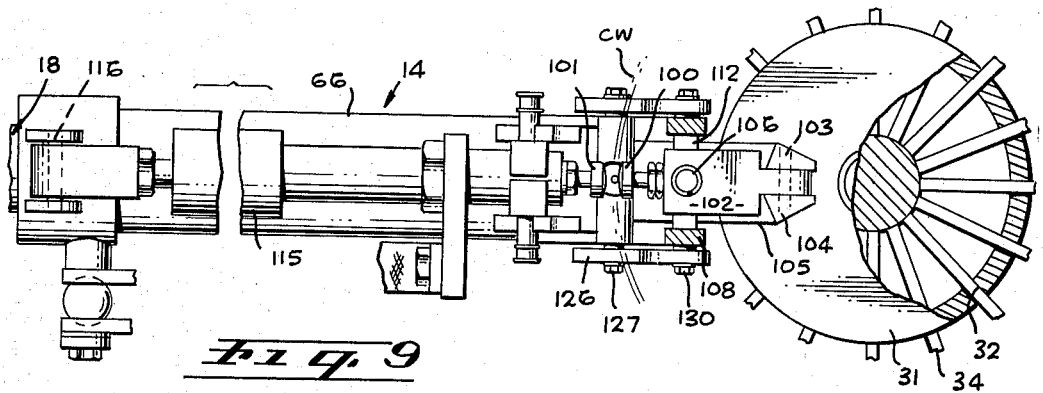
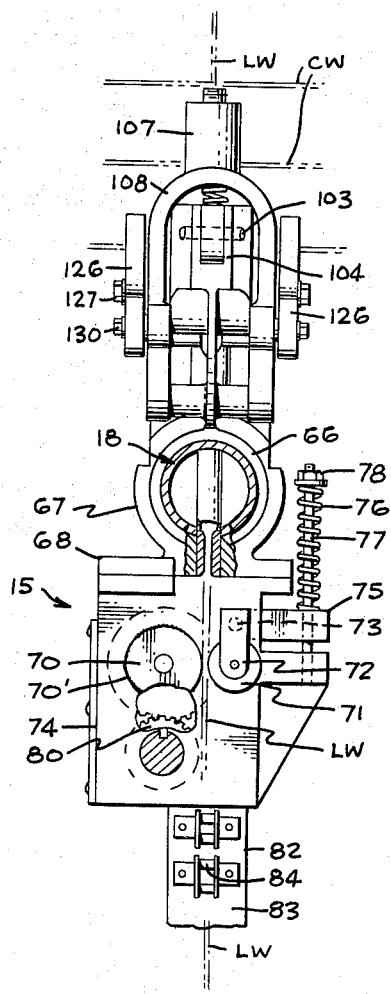
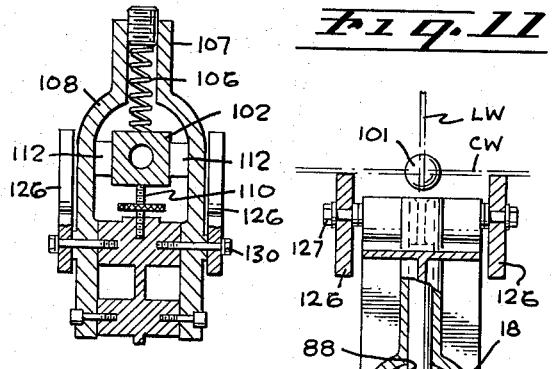
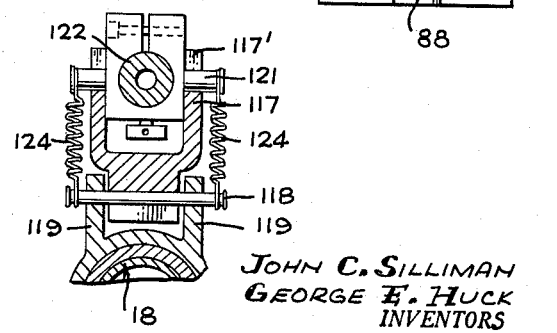
JOHN C. SILLIMAN
GEORGE F. HUCK
INVENTORS

United States Patent Office 3,215,169
Patented Nov. 2, 1965

3,215,169
MACHINE FOR MAKING WIRE CAGES
John Calvin Silliman, La Habra, and George E. Huck, Fullerton, Calif., assignors to American Pipe and Construction Co., South Gate, Calif., a corporation of California
Filed Apr. 15, 1963, Ser. No. 273,154
9 Claims. (Cl. 140—112)

This invention has to do with apparatus for fabricating reticulated wire structures and particularly wire cages used as reinforcement in concrete pipe.

Reinforcement wire cages are tubular and include a plurality of circumferentially spaced longitudinal wires and one or more circumferential wires wrapped therearound, the wires being welded together at the intersections.

In our copending application for patent Serial No. 224,437, filed September 18, 1962 we show a machine for automatically making cages of relatively large diameter over a wide range of sizes. The present machine is useful for making cages over a smaller size range and has certain advantages over the other machine for making smaller cages. However, both machines are adaptable to making cages of any practical diameter.

An object of the invention is to provide a novel automatic machine for making wire cages wherein the longitudinal wires are fed continuously and a circumferential wire (or wires) wrapped therearound and welded to the longitudinal wires.

Another object is to provide a novel assembly of wire feed and welding units which are so constructed that they can be readily adjusted radially of a common center for the purpose of making a cylindrical cage of any desired diameter within the range of the machine and for the purpose of making cages of cross-sectional shapes other than cylindrical.

A further object is to provide a machine of the type indicated embodying a turntable with circumferential wire feed means and embodying a plurality of wire feed units independent of the turntable together with novel means for rotating the turntable and for driving the wire feed units in synchronism.

More particularly it is an object to provide a novel mechanical drive for the wire feed units which enables the adjusted positioning of the units radially of a common center without disturbing any of the drive mechanisms and which accomplishes this with a single prime mover.

Another object is to provide a plurality of wire feed units having unique drive means wherein the individual units can be readily demounted where it is desirable to utilize a lesser number than the total number accommodated by the machine, as in the making of small-diameter cages.

Still another object is to provide novel welding units for joining the longitudinal and circumferential wires as the longitudinal wires advance.

A further object is to provide novel means for feeding a circumferential wire around a plurality of longitudinal wires (or any object) which includes novel safety means for automatically severing the circumferential wire in the event that it becomes entangled or fails to pay out properly.

Another object is to provide a novel machine of relatively simple construction capable of high-speed fabrication of wire cages.

These and other objects will be apparent from the drawings and the following description. Referring to the drawings:

FIG. 1 is a central sectional elevational view of apparatus embodying the invention;

FIG. 2 is a fragmentary plan view of the apparatus of FIG. 1;

FIG. 3 is an enlarged fragmentary sectional elevational view on line 3—3 of FIG. 2;

FIG. 4 is a sectional view on line 4—4 of FIG. 3, but on a larger scale;

FIG. 5 is a sectional view on line 5—5 of FIG. 3;

FIG. 6 is a sectional view on line 6—6 of FIG. 1, but on the larger scale of FIG. 5;

FIG. 7 is an enlarged fragmentary elevational view of a welding unit, the view being in the same plane as that of FIG. 3;

FIG. 8 is a sectional plan view on line 8—8 of FIG. 7;

FIG. 9 is a sectional elevational view on line 9—9 of FIG. 7;

FIG. 10 is a fragmentary sectional view on line 10—10 of FIG. 7;

FIG. 11 is a fragmentary sectional view on line 11—11 of FIG. 7; and

FIG. 12 is a fragmentary sectional view on line 12—12 of FIG. 7.

In general, the apparatus includes a center post 11, an annular turntable 12 concentric therewith and supported upon a circular framework 13, a plurality of wire feed and welding units 14 each of which includes means 15 for feeding a wire vertically and means 16 for welding the intersection of the vertically fed wire and a circumferential wire wrapped therearound by means 17 on the turntable. The wire feed and welding units 14 are mounted upon beams 18 which radiate from the center post 11 and are supported at their outer ends on a framework 20. The fabricated cage C, shown in broken lines in FIG. 1, rises vertically from the machine and can be cut off at any point.

Describing the invention in more detail, the center post 11 includes a tubular main section 22 (FIG. 3) supported rigidly by a base 23. Section 22 may serve as a header for the distribution of cooling fluid to the welding electrodes and is shown as having an inlet fitting 22', however the distribution conduits have not been shown. The upper end of section 22 is closed by a plate 24 in which is mounted a rod 25. This has a large-diameter lower section 26, an intermediate section 27 of smaller diameter and an upper section 28 of further reduced diameter. A ring 30 on the upper end of section 22 of the post supports a removable cap 31 which has a plurality of radial slots 32 therein. This member accommodates tongue-like inner ends 34 of the beams 18. The remaining portion 35 of each beam is tubular and the outer end thereof is supported upon an annular shelf 36 forming part of framework 20 by a bracket 37.

All but one of the beams 18 are demountable so that more or less of the units 14 may be used at any one time as required for the particular cage to be made. The non-demountable beam, shown at the left in FIG. 1 and best shown in FIG. 3, supports a main drive shaft 40 and a secondary drive shaft 41, these being journaled in two depending hangers, designated 42 and 43, respectively. each of the other beams supports a secondary drive shaft 41 in a pair of depending hangers 44 and 45 (FIG. 1).

Mounted on the center post is what will be termed a transmission 48 which in essence comprises two vertically spaced ring gears, designated 49 and 50, respectively, which are fixed to a cylinder 51 mounted for rotation on the center post.

The main drive shaft 40 is provided with a pinion 52 of the hypoid gear type which meshes with the lower ring gear 50 and serves to drive it and the upper ring gear 49. Each of the secondary drive shafts 41 is provided with hypoid pinion gear 53 which meshes with the upper ring gear and is driven by it. The gears 53, as will be seen in FIG. 4, are arranged so that those of alternate shafts engage the inner and outer portions of the ring gear 49, respectively, to facilitate the use of a greater number of beams than shown in FIG. 4 with and requiring closer spacing of the pinions.

The main drive shaft 40 is driven by a motor 56 (FIG. 1) having a shaft 56' (FIG. 2) through a reduction gear means 57, clutch 58, and shafts 59 and 60, the latter being connected to shaft 40 by a chain drive 61. The motor also serves to rotate the turntable 12 by means of a chain 62 which passes around a driven sprocket 63 and around the turntable, the latter having intermittent sets of sprocket teeth 64 on its periphery to receive the chain.

Referring now particularly to FIGS. 3-12, each of the wire feed and welding units 14 includes a tubular body or frame 66 which receives the beam and is positionable at different points thereon. The inner end of the body has a collar 67 provided with a mounting flange 68 to which the wire feed unit 15 is attached as by screws, not shown. The unit 15 includes a driven feed roller 70 with a knurled or toothed periphery 70' and an idler roller 71 (FIG. 9). The latter is carried upon a short lever 72 depending from a shaft 73 which is journaled in the housing 74 and which carries a lever 75 at its opposite end. Lever 75 is biased by a spring 76 on a rod 77 mounted in the body of the unit and having nut 78 on its end.

The associated secondary drive shaft 41 is received in the housing 74 and projects therethrough to opposite sides thereof, the shaft being received in a gear 80 to which it is keyed as shown. However, the gear is slideable relative to the shaft so that the entire unit 15 is movable along the shaft.

The wire feed means is provided with a wire guide means and this comprises a frame 82 having an arcuate surface 83 upon which are mounted a series of rollers 84 over which the wire rides, the device having an eye 85 at its lower outer end. The several longitudinal wires (so-called because they extend longitudinally of the fabricated cage), designated LW, may lead from any source of wire, such as a plurality of reels 86 located radially outward of framework 13, one such reel being shown in FIG. 2.

Each beam is longitudinally slotted at 88 throughout a large portion of its length to receive a wire guide tube 90 which is mounted in the frame 66 and which receives the wire after it leaves the wire feed rollers 70 and 71. This tube terminates above the beam short of the elevation at which the circumferential wire, designated CW, is initially wrapped around the longitudinal wires. The welding units 16 are carried above the beams on the frames 66. The welding means includes a backup electrode 100 and a primary electrode 101. The former is mounted on a backup lever 102 which is carried on a pin 103 in a bifurcated inner portion 104 of a frame structure 105 which extends upwardly and inwardly of the main frame 66. A spring 106 mounted in a boss 107 at the upper end of a yoke 108 (FIG. 10) normally serves to depress the lever and an adjustment screw 110 located below the lever in frame section 111 provides for locating the lever at the proper elevation. Projections 112 inside the yoke serve to center and guide the lever.

The primary electrode 101 is carried on the end of a fluid ram 115 the outer end of which is pivotally mounted at 116 on the frame 66. The inner end of the ram is supported in a bifurcated lever 117 (FIG. 12) which is pivotally mounted on a pin 118 extending through two upright ears 119 on the frame 66. Lever 117 is slotted radially of its pivotal axis at 117' to receive trunnions 121 projecting from the sides of the electrode 101 which is carried on the end of the piston rod 122 of the ram. The trunnions are yieldably urged to the bottom of the slots 117' by springs 124 which are connected between the trunnions and the pin 118.

The normal or inoperative position of the ram and the electrode is shown in broken lines in FIG. 4 from which it will be seen that, with the ram contracted, lever 117 and the ram are inclined at only a slight angle to the horizontal. Upon expansion of the ram the parts move to the position shown in full lines in FIG. 4 wherein the two electrodes are then in alignment and on opposite sides of the intersection of a longitudinal wire LW which is being fed upwardly and the circumferential wire CW which is being initially wrapped around the longitudinal wires at this elevation. A pair of L-shaped horns 126, shown mounted by cap screws 127 and 128 through slots 129 and 130, respectively, serve as guides for the circumferential wire. The yoke 108 also carries a guide wheel 131 above the horns for the longitudinal wire.

In the welding operation the ram 115 is expanded to move the parts to the position of FIG. 4, at which time welding current is initiated. The two electrodes 100 and 101 may then rise vertically with the wires they are gripping to follow the rising cage wires until the weld has been completed. This is made possible by the fact that the trunnions 121 supporting the inner end of the ram-mounted electrode 101 can rise in their slots 117' while the backup electrode 100 and its lever 102 pivot upwardly. Spring 106 returns the lever 102 while springs 124 return the electrode 101 when the welding cycle is completed and the ram 115 contracted.

As previously indicated, all but one of the beams 18 are are demountable and in FIG. 1, one beam has been shown in broken lines in lowered demounted position resting upon a supplemental shelf 135. The inner end can rest upon a support 136.

The turntable 12 which rotates in synchronism with the wire feed units 15 in the direction of the arrow in FIG. 2 is supported on a rail 137 by wheels 138 and guided by a rail 139 and rollers 140. The turntable carries the means 17 for wrapping the circumferential wire CW around the longitudinal wires LW as the same are fed vertically by the wire feed units. Means 17 includes a fixed fairlead arm 141 carrying sheaves 142 through which the wire pays out. It also includes a rotatable wire supply reel 143 from which the wire passes around sheaves 144, 145 and 146. The latter is mounted on an arm 147 which is pivotally mounted at 148 and yieldably held in the position shown by springs 149. In the event that the tension on the wire CW becomes excessive due to its snarling or failing to freely lead from the supply reel, the sheave 146 moves radially inward of the device as a whole pivoting lever 147. This serves to actuate a rod 150 which is connected at 151 to the arm. The rod in turn actuates a wire severing means 152 which serves to cut the wire, thereby preventing damage to the machine and the cage being formed.

It is believed that the operation of the machine will be apparent from the description thus far. However, it is to be understood that suitable electric control and operation means and suitable fluid control and operation means will be provided in a manner known by those skilled in the art for the purpose of furnishing the welding current and initiating the welding cycles of each of the welding units. Such means may include a finger or the like on the turntable which serves to actuate switches positioned at appropriate distances around a circle in the path of the finger. Also its is to be understood that the fluid units may be operated in any suitable manner.

Although we have shown and described a preferred form of our invention, we contemplate that various changes and modifications can be made without departing from the invention, the scope of which is indicated by the claims.

We claim:

1. In a machine for fabricating wire cages, an upright center post, a plurality of beams radiating from said center post, means supporting said beams at their outer ends, a transmission carried on said center post, a prime mover, means operably connecting the prime mover and transmission, a drive shaft carried by each beam in parallel relation thereto and having its inner end received in and driven by the transmission, and a wire feed unit carried by each beam, each said unit receiving the drive shaft of its associated beam, certain at least of said beams and their associated drive shafts being individually demountable.

2. In a machine for fabricating wire cages, an upright center post, a first beam supported at its inner end on said center post and extending radially therefrom, a transmission carried by said center post, a main drive shaft carried by said first beam in parallel relation thereto and operatively connected to drive said transmission, a secondary drive shaft carried by said first beam in parallel relation thereto and operatively connected to be driven by said transmission, power means for driving said main drive shaft, a plurality of other beams supported at their inner ends on said center post and extending radially therefrom in circumferentially spaced relation, a secondary drive shaft carried by each of said other beams, wire feed means carried by said first beam and by each of said other beams, said wire feed means on each beam being driven by the secondary drive shaft thereof, and means supporting the outer ends of said beams.

3. The machine set forth in claim 2 in which at least some of said other beams and their shafts are demountable.

4. The machine set forth in claim 2 in which the wire feed means on each beam is adjustable therealong and along its associated secondary drive shaft.

5. In a machine for fabricating wire cages, means for feeding a wire vertically, comprising a horizontally extending beam, means supporting the beam, a frame mounted on the beam and adjustably positionable therealong, said beam being vertically slotted, a vertical guide tube carried by the frame and extending through the slotted portion of the beam, feed wheels carried by said frame below said beam, a drive shaft carried by said beam parallel thereto and operably connected to one of said feed wheels, said frame and feed wheels being operably positionable at various points along said shaft.

6. In a machine for fabricating tubular wire cages by feeding a plurality of longitudinal wires axially of the cage to be formed in circumferentially spaced relation, helically wrapping a circumferential wire therearound, and welding the intersections of the circumferential and longitudinal wires, welding means, comprising a support extending radially of the longitudinal axis of the wire cage to be formed, an elongated frame mounted on the support, a bracket carried on said frame, a backup lever pivotally mounted at its inner end on the bracket inwardly of the path of a longitudinal wire, the pivotal axis of the lever being normal to the path of a longitudinal wire, said lever carrying a welding electrode at its outer end, a fluid ram pivotally mounted at its outer end on said frame and carrying a welding electrode at its inner end, a ram-supporting lever pivotally mounted on said frame at one end and on an axis parallel to that of said first mentioned lever pivotally supporting said fluid ram adjacent its inner end at a region adjacent the electrode carried by the ram, said ram and its electrode lying close to said frame and lever with the ram contracted and being movable at its electrode end away from said frame to alignment with the backup electrode when said ram is expanded and said lever pivots in response thereto.

7. The welding means set forth in claim 6 in which said ram is mounted on said ram-supporting lever for limited movement longitudinally of the lever whereby to enable said ram and its electrode to follow the movement of the cage being formed upon the gripping of a wire intersection between the two electrodes.

8. The welding means set forth in claim 7 in which spring means is provided for returning said backup lever to a given position and for returning said ram longitudinally of the ram-supporting lever.

9. In a machine for fabricating wire cages including means for feeding a plurality of wires axially of the cage to be formed, means for wrapping a circumferential wire around said plurality of wires comprising a turntable mounted for rotary movement around said plurality of wires, a supply reel carried on said turntable, a severing means through which said circumferential wire passes, fairlead means through which said circumferential wire passes, and wire-tautness sensing means engageable by said circumferential wire connected to operate said wire severing means if the tautness of the wire exceeds a predetermined value.

References Cited by the Examiner
UNITED STATES PATENTS

| | | | |
|---|---|---|---|
| 2,050,832 | 8/36 | Edwards | 140—112 |
| 3,125,132 | 3/64 | Knisely | 140—112 |

CHARLES W. LANHAM, *Primary Examiner.*